Sept. 24, 1929.　　　D. F. MURPHY ET AL　　　1,729,591
ELECTRIC SIGNALING DEVICE FOR AUTOMOBILES
Original Filed July 6, 1922　　2 Sheets-Sheet 1
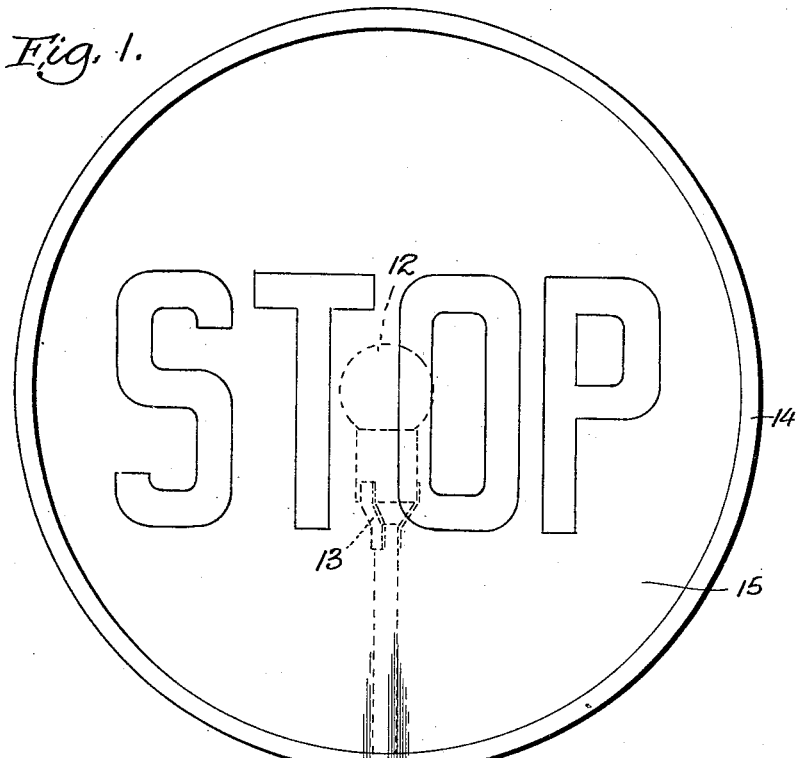
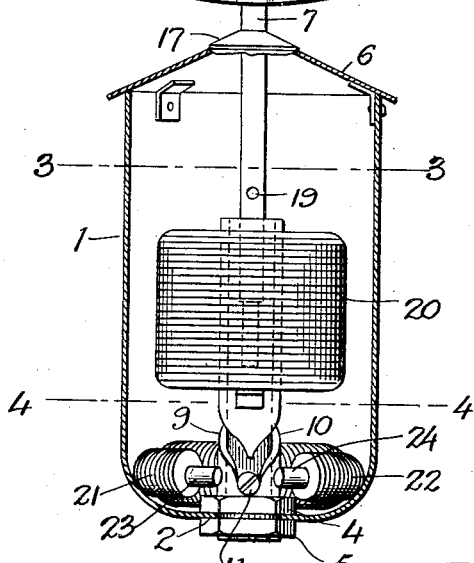
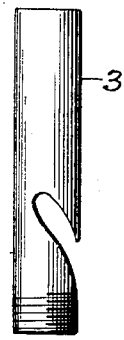
INVENTOR.
Daniel F. Murphy
BY and Luke Cotter
ATTORNEY.

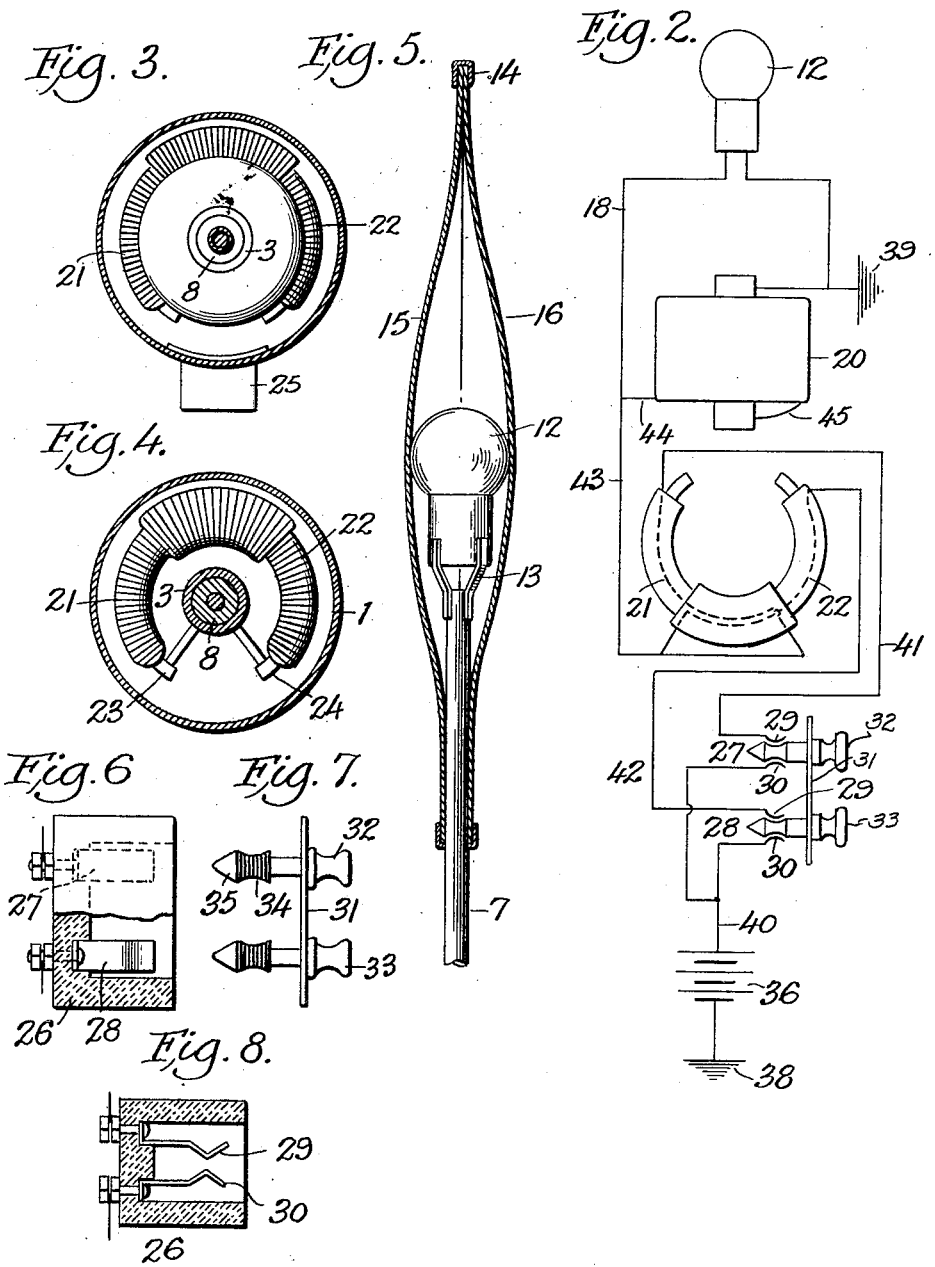

Patented Sept. 24, 1929

1,729,591

UNITED STATES PATENT OFFICE

DANIEL F. MURPHY AND LUKE COTTER, OF DENVER, COLORADO

ELECTRIC SIGNALING DEVICE FOR AUTOMOBILES

Application filed July 6, 1922, Serial No 573,079. Renewed April 5, 1929.

Our present invention pertains to electric signaling devices for automobiles, and relates particularly to a device of this character for use on automobiles and other vehicles, especially of the closed type.

An object of this invention is to provide a device which can be used in place of the hand signals now commonly employed to comply with traffic regulations, and which can be given from closed automobiles or other vehicles.

A further object resides in providing a structure which can be installed upon either or both sides of a vehicle, at any point on the forward or rear portion, and which is of compact and substantial form to thus offer very little extension from the vehicle.

A still further object is to so construct the parts that the signal is electrically operated and shifted to the indicating positions, and that the parts automatically return to neutral position when the electric circuit is opened.

With the above and other objects in view, which will be apparent from the drawings, specification and claims, this invention includes certain novel features of construction and combination of parts which will now be set forth.

In the drawings:

Figure 1 is a view in side elevation of the signaling device with the case shown in section.

Fig. 2 is a diagrammatic view indicating the circuit wiring.

Fig. 3 is a transverse sectional view through the case and enclosed parts on line 3—3 of Fig. 1.

Fig. 4 is a similar sectional view on line 4—4.

Fig. 5 is a transverse sectional view through the signal flag.

Fig. 6 is a detail of the switch block.

Fig. 7 is a detail side view of the switch buttons.

Fig. 8 is a transverse sectional view through the switch block.

Fig. 9 is a view in side elevation of the guide tube.

The case 1 is made substantially tubular and is closed at its lower end, an opening 2 being provided to receive the threaded end of a guide tube 3. Trap nuts 4 and 5 are turned onto the threaded end of the guide tube on opposite sides of the material of the casing to rigidly mount this tube in an upright position centrally within the casing 1. A substantially conical top 6 is provided to close the upper open end of the casing 1 and has an overhanging flange to exclude water and insure a water-tight closure.

The cover 6 has an opening at its apex through which a tubular stem 7 is slidably received, and at its lower end this stem carries a soft iron core 8 which is slidably received in the guide tube 3. The guide tube has the branched inclined slots 9 and 10 formed through the side wall adjacent its threaded end to present a substantially Y-shape form, these slots each being branched to extend approximately 90° on each side. A pin 11 is secured in the core 8 and slides in the branched slots 9 and 10.

At its outer end the stem 7 has an electric lamp 12 supported by brackets 13. A ring 14, U-shaped in cross section, is mounted on the stem 7 concentrically around the lamp, and transparent sheets 15 and 16 are secured at their edges by the spring, to be held on opposite sides of the lamp. One of the transparent sheets is preferably red and has the word "Stop" thereon while the opposite sheet is of a contrasting color and shows the word "Turn", or some other suitable direction-indicating term. Below the ring 14 a frusto-conical flange 17 is provided on the stem 7, this flange being adapted to close over the apex of the cover 6 when the signal is in the neutral position, where pin 11 is centered between guide slots 9 and 10, and to thus exclude water from the opening in the cover 6 through which stem 7 slides. One terminal from the lamp 12 is grounded on the stem 7, and a circuit wire 18 leads from the remaining terminal and passes through an opening 19 in the tubular stem 7. This opening 19 is sufficiently low that the wire passing therethrough does not interfere with free sliding movement of the stem within the limits defined by pin 11 moving in the guide slots 9 and 10.

A solenoid coil 20 is provided around the upper portion of guide tube 3, above the guide slots, and the curved magnets 21 and 22 are mounted around the lower end of the guide tube, with their cores 23 and 24 separated from and substantially in line with the pin 11 when in the neutral position.

In the use of the device, the casing 1 is mounted in any desired manner upon the vehicle with clearance for rotation of the signal flag portion, and the electric wire connections may be made through a tube 25 provided on the side of the case. The circuit connections are controlled in a suitable type of switch or button, but we have found that the one illustrated in Figs. 6 to 8 are efficient in use. As here disclosed the switch block 26 is of insulating material and has the two sets, 27 and 28 of spring contacts. Each set of contacts comprises the two spring members 29 and 30 which are shaped at their ends as best shown in Fig. 8. A cover plate 31 for the switch block has the stems of buttons 32 and 33 slidably mounted therethrough in line with the sets of contacts 27 and 28. At their inner ends these stems have grooved insulating rings 34, and the stems terminate in substantially conical conducting portions 35. In the use of the switch, when the buttons 32 and 33 are pulled out, the points 35 will establish a circuit closing connection between the spring contacts 29 and 30, and when the buttons are pushed in the insulating portions 34 will break the circuit between these spring contacts.

The circuit wiring, as illustrated in Fig. 2, has been found satisfactory, and as here shown, the battery 36 has one terminal grounded as at 38 in a suitable manner to connect the ground with the guide tube 3, this ground 38 and the ground 39 being to all intents and purposes the same. The circuit wire 40 leads from the remaining terminal of the battery to the contacts 30 of each of the contact sets 27 and 28. A wire 41 from the terminal 29 of contact set 27 connects with one of the terminals of magnet 21, and a wire 42 leads from contact set 28 to a terminal of magnet 22. A wire 43 is connected with the remaining terminal of the coils of magnets 21 and 22, and is branched as at 44, to lead to the coil of solenoid 20, and at 18 to lead to the lamp 12. As has been stated, the remaining terminal of lamp 12 is mounted, and the remaining terminal of the solenoid coil is grounded as at 45 on the guide tube 3. With this arrangement and connection of the parts, when the button 32 is pulled out, from the position in Fig. 2, a circuit connection is established through a wire 41 and through magnet 21, solenoid 20 and the lamp 12. As the core 23 is energized the pin 11 on core 8 is attracted and as the stem 7 is moved upwardly by the attracted force of solenoid 20 on this core 8 the pin will be shifted sufficiently to pass into guide slot 9 and the stem and signal flag will be given a quarter turn. When switch button 33 is pulled out the magnet 22, and the remaining parts as above set forth will be placed in the circuit, and in consequence pin 11 will be attracted by core 24 to move into guide slot 10 and give a quarter turn to the signal flag in an opposite direction. When the circuit through the switch buttons is opened, the solenoid 20 is deenergized and stem 7 recedes by gravity to bring pin 11 back to a centered position, thus returning the signal flag to a neutral position in which the edge only is visible from the front and rear.

While we have set forth only certain specific details of construction and have mentioned but one circuit arrangement, it will be appreciated that we do not wish to limit ourselves to the exact construction and specific arrangements of parts, but only to such points as may be defined in the appended claims.

We claim:

1. An electric signaling device for automobiles comprising, with a case to be mounted on the automobile, a guide tube in the case having a substantially Y-shaped guide slot through its wall, a stem slidably mounted in the guide tube, a pin on said stem received in the guide slot, a signal flag carried by the outer end of said stem having signal indications on its opposite sides, means within the case to extend the stem with the pin in one of the branches of the guide slot, and means within the case to selectively direct the pin into either of the branches to determine which side of the signal flag shall be turned to view.

2. An electric signaling device for automobiles comprising, with a case to be mounted on the automobile, a guide tube in the case having a substantially Y-shaped guide slot through its wall, a stem slidably mounted in the guide tube, a pin on said stem received in the guide slot, a signal flag carried by the outer end of said stem having signal indications on its opposite sides, a solenoid coil mounted around said guide tube to extend the stem, electro-magnets on opposite sides of a normal position of said pin to be selectively energized to attract the pin and direct said pin into one of the branches of the guide slot, and a circuit arrangement to selectively energize one of said magnets and the solenoid.

3. An electric signaling device for automobiles comprising, with a solenoid, a guide tube within the solenoid provided with a substantially Y-shaped guide slot through its wall, a stem slidably and revolubly mounted in the tube, a pin on said stem extending through the slot and projecting as an armature, a signal flag carried on the outer end of the stem, curved electromagnets located around the tube with their core terminals in line with and on opposite sides of the pin, an electric circuit including the solenoid and having reversing connections with the magnets, and control means for the circuit to selectively energize the magnets to draw the armature in either direction and to simultaneously energize the solenoid.

In testimony whereof we affix our signatures.

DANIEL F. MURPHY.
LUKE COTTER.